(12) United States Patent
Pedersen

(10) Patent No.: US 9,545,114 B2
(45) Date of Patent: Jan. 17, 2017

(54) CONVEYING DEVICE FOR ITEMS IN THE FISH AND MEAT PROCESSING INDUSTRY

(71) Applicant: Nordischer Maschinenbau Rud. Baader GmbH + Co. KG, Lubeck (DE)

(72) Inventor: Henning B. Pedersen, Ikast (DK)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/425,133

(22) PCT Filed: Aug. 28, 2013

(86) PCT No.: PCT/EP2013/067832
§ 371 (c)(1),
(2) Date: Mar. 2, 2015

(87) PCT Pub. No.: WO2014/033177
PCT Pub. Date: Mar. 6, 2014

(65) Prior Publication Data
US 2015/0257398 A1    Sep. 17, 2015

(30) Foreign Application Priority Data
Aug. 29, 2012    (DE) .................... 20 2012 103 282 U

(51) Int. Cl.
*B65G 21/06*    (2006.01)
*A22C 17/00*    (2006.01)
(Continued)

(52) U.S. Cl.
CPC ........... *A22C 17/0093* (2013.01); *A22C 25/08* (2013.01); *B65G 15/28* (2013.01); *B65G 21/06* (2013.01);
(Continued)

(58) Field of Classification Search
CPC ................................ B65G 21/06; B65G 21/10
(Continued)

(56) References Cited

U.S. PATENT DOCUMENTS 1,481,542 A    1/1924    Dunseith, Jr.
3,153,477 A    10/1964    Tipton
(Continued)

FOREIGN PATENT DOCUMENTS

DE    19519792 A1    12/1996
EP    0794137 A1    9/1997
(Continued)

OTHER PUBLICATIONS

International Search Report dated Nov. 21, 2013 from International Patent Application No. PCT/EP2013/067832 filed Aug. 28, 2013.
(Continued)

*Primary Examiner* — Douglas Hess
(74) *Attorney, Agent, or Firm* — Sunstone IP

(57) ABSTRACT

The present invention relates to a conveying apparatus for items in the fish and meat processing industry, comprising a conveyor belt for conveying the items in a conveying direction, at least one mounting base extending at least along a partial section of the conveyor belt and at least one functional unit configured for interaction with the items, wherein each of the functional units is arranged on a holding means and is characterized in that the holding means are designed and adapted in such a manner that each of the functional units is separably connected to the mounting base by means of the holding means and is arranged so as to be adjustable at least in the conveying direction.

13 Claims, 7 Drawing Sheets

Figure 1:
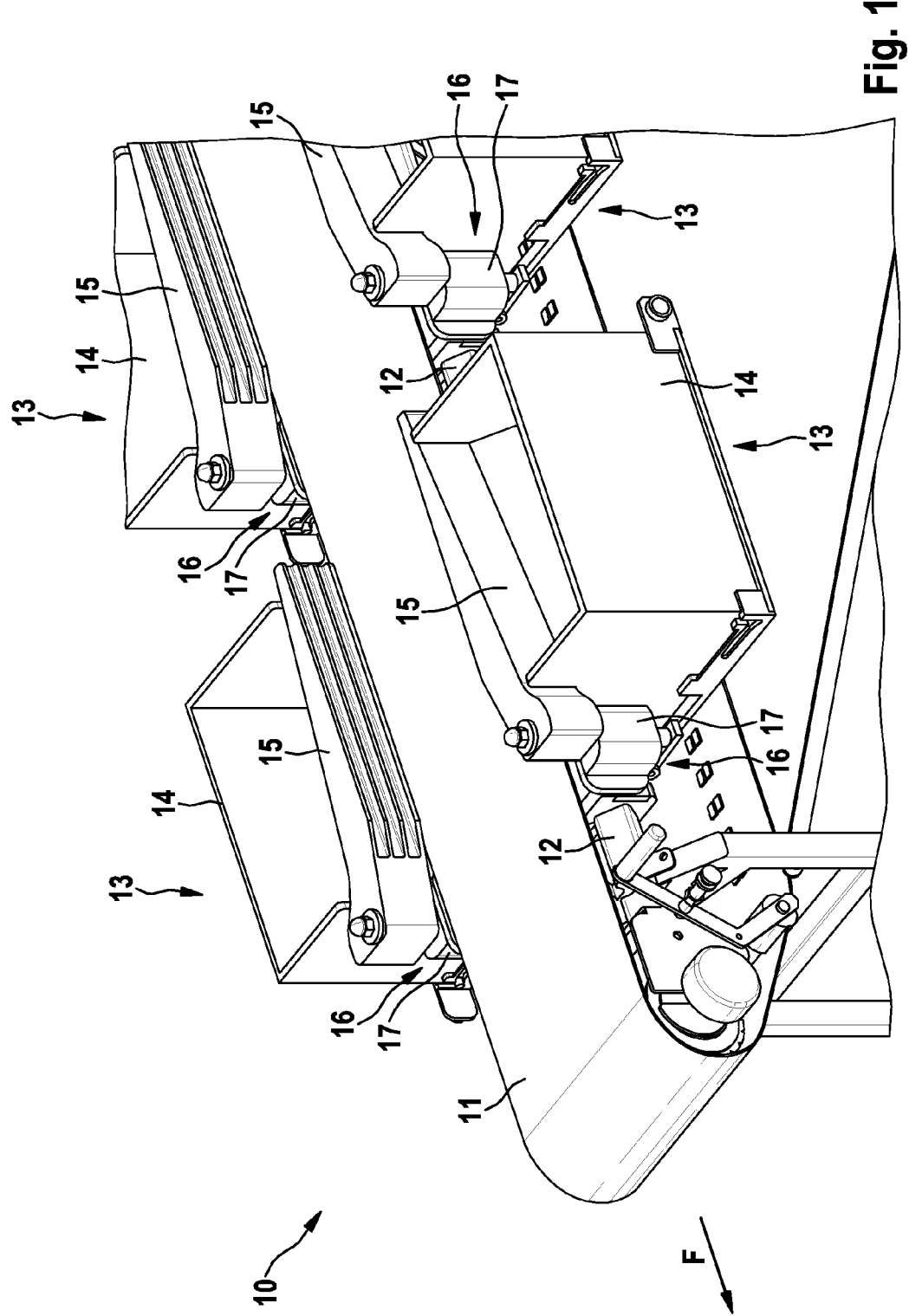

(51) Int. Cl.
  *A22C 25/08*   (2006.01)
  *B65G 47/82*   (2006.01)
  *B65G 15/28*   (2006.01)
  *B65G 47/76*   (2006.01)
  *B65G 17/08*   (2006.01)

(52) U.S. Cl.
  CPC ............ *B65G 47/766* (2013.01); *B65G 47/82* (2013.01); *B65G 17/08* (2013.01); *B65G 2207/30* (2013.01)

(58) Field of Classification Search
  USPC ......... 198/936.1, 836.2, 836.3, 836.4, 860.1, 198/861.1
  See application file for complete search history.

(56) References Cited

U.S. PATENT DOCUMENTS

| | | | | |
|---|---|---|---|---|
| 3,241,650 | A | | 3/1966 | Horton |
| 3,313,400 | A | * | 4/1967 | Johnson ............ B65G 21/2072 198/836.3 |
| 3,524,531 | A | | 8/1970 | Georg |
| 3,796,503 | A | | 3/1974 | Dawson |
| 3,874,497 | A | * | 4/1975 | Carlson ............ B65G 21/2072 198/836.3 |
| 4,258,840 | A | * | 3/1981 | Conkle ................. B65G 43/04 198/502.4 |
| 4,674,626 | A | * | 6/1987 | Adcock ................. B65G 15/60 198/720 |
| 4,982,835 | A | | 1/1991 | Butler |
| 5,211,280 | A | * | 5/1993 | Houde ............... B65G 21/2072 198/836.3 |
| 5,568,920 | A | | 10/1996 | Moll |
| 5,582,286 | A | * | 12/1996 | Kalm .................. B65G 47/261 198/781.06 |
| 5,701,991 | A | | 12/1997 | Helmetsie |
| 5,947,263 | A | | 9/1999 | Uber |
| 6,612,420 | B1 | | 9/2003 | Hartness, III et al. |
| 7,735,638 | B2 | * | 6/2010 | Hau ....................... B65G 21/06 198/860.1 |
| 7,798,315 | B2 | * | 9/2010 | Shun ..................... B65G 21/06 198/836.3 |
| 7,837,030 | B2 | * | 11/2010 | Daly ..................... B65G 15/62 198/822 |
| 7,980,386 | B2 | * | 7/2011 | Ours .................... B65G 41/002 198/861.3 |
| 8,006,831 | B1 | * | 8/2011 | Mackin .................. B65G 21/02 198/812 |
| 8,166,638 | B2 | * | 5/2012 | Chan .................. H05K 13/0408 29/747 |
| 8,205,740 | B2 | * | 6/2012 | Dragon .............. B65G 21/2072 198/466.1 |
| 8,490,780 | B2 | * | 7/2013 | Bell .................... B65G 21/2072 198/836.1 |
| 8,695,787 | B2 | * | 4/2014 | Bell .................... B65G 21/2072 198/836.1 |
| 8,844,315 | B2 | * | 9/2014 | Bilger ....................... F25D 3/11 198/860.3 |
| 2002/0148709 | A1 | | 10/2002 | Claig et al. |
| 2005/0186896 | A1 | | 8/2005 | Nielsen |
| 2010/0051513 | A1 | | 3/2010 | Skyum et al. |

FOREIGN PATENT DOCUMENTS

| | | |
|---|---|---|
| EP | 1767474 A2 | 3/2007 |
| EP | 2353392 A1 | 8/2011 |
| JP | S5280970 U | 6/1977 |
| WO | 2005032979 A2 | 4/2005 |
| WO | 2011012802 A1 | 2/2011 |
| WO | 2011138052 A1 | 11/2011 |

OTHER PUBLICATIONS

International Preliminary Report on Patentability dated Mar. 3, 2015 from International Patent Application No. PCT/EP2013/067832 filed Aug. 28, 2013.

* cited by examiner

CONVEYING DEVICE FOR ITEMS IN THE FISH AND MEAT PROCESSING INDUSTRY

The present invention relates to a conveying apparatus for items in the fish and meat processing industry, comprising a conveyor belt for conveying the items in a conveying direction, at least one mounting base extending at least along a partial section of the conveyor belt and at least one functional unit configured for interaction with the items, wherein each of the functional units is arranged on a holding means.

Such conveying apparatuses are used in particular when distributing items in the fish and meat processing industry. Conveying and distribution apparatuses are known in which the items are conveyed in a conveying direction by means of a conveyor belt and are distributed, by means of arms that are pivotable laterally, into the conveying path into containers or to other conveyor belts. The arms are generally controlled via control devices which actuate the arms at appropriate times depending on item properties that are predefined and/or detected by sensors. The item properties are detected, for example, by sensors arranged on the conveyor belt and are evaluated by the control device. In known conveying apparatuses, the functional units, that is to say the arms, the containers and sensors, are arranged in a fixed position and are generally permanently joined inseparably to the conveyor belt and its substructure.

It is a disadvantage that the known conveying apparatuses can each only be used for one application. From the hygiene point of view, the aforementioned apparatuses are also disadvantageous as the functional units make cleaning the conveyor belt and the other parts of the overall conveying apparatus considerably more difficult. In addition, the replacement of individual functional units is very complicated and time-consuming overall.

The object of the present invention is therefore to propose an easy to clean conveying apparatus which ensures variable and easy arrangement of functional units.

The object is achieved by an arrangement having the features referred to at the outset in that the holding means are designed and adapted in such a manner that each of the functional units is separably connected to the mounting base by means of the holding means and is arranged so as to be adjustable at least in the conveying direction. This offers the advantage that both the position of the respective functional unit and also the type of functional units is freely configurable. Thus both sensors and sensor systems, such as optical camera systems, weighing devices or the like, for example, and also actuators, for example, controllable arms and/or flaps, processing tools, scrapers or the like, can be joined to the mounting base as functional units and be detached from it again in a simple manner. Baskets or boxes, for example, can also be arranged as functional units such that the conveying apparatus is simultaneously configured as a distribution device. Due to the adjustable arrangement of the functional units in the conveying direction, the functional units can be positioned exactly and be readjusted as necessary. In other words, the functional units are arranged movably parallel to the conveyor belt while they are fixed in relation to the other spatial directions. A further advantage is that the functional units or the holding means can be detached from the mounting base in a simple manner such that, on the one hand, quick replacement of individual functional elements is enabled and, on the other hand, cleaning of parts of the conveying apparatus is made considerably easier compared to rigidly arranged functional units.

An expedient embodiment of the invention is characterised in that the holding means comprises at least one foot element with a receiving area, wherein the receiving area is designed at least partially corresponding to the cross-section of the mounting base. By means of the receiving area of the foot element configured corresponding to the cross-section of the mounting base, the holding element is held in position and, at the same time, movability or adjustability is guaranteed parallel to the conveyor belt.

A preferred further embodiment of the invention is characterised in that the receiving area of the foot element is designed in such a way that the foot element at least partially encompasses the mounting base in a positive locking manner. In other words, the foot element does not completely enclose the cross-section of the mounting base such that the mounting base can be supported on the conveying apparatus or the foundation in the areas that are not enclosed, for example by means of cross struts.

According to a further expedient embodiment of the invention, the foot element is designed in such a manner that the foot element is joined to the mounting base in a positive locking manner. This offers the advantage that the foot element is arranged detachably on the mounting base exclusively or additionally by means of a non-positive locking engagement.

A further advantageous development of the invention is characterised in that the foot element comprises at least two clamping elements which are designed and adapted for joining the foot elements to the mounting base. In other words, the joint between the foot element and mounting base is designed as a clamped joint. The foot element is reliably attached to the mounting base due to the clamping.

According to a further preferred embodiment of the invention, the foot element and the mounting base are designed as a linear guide. In this manner, the holding means and the functional units are designed movably in a direction, preferably parallel to the conveying direction, such that on the one hand the weight of the mounting base is accommodated and the functional units are held securely, and on the other hand easy adjustability is guaranteed at the same time.

A preferred embodiment of the invention is characterised in that the clamping elements are designed as clamps. On the one hand, the foot element is joinable to the mounting base by means of the clamps in a particularly easy manner and is designed and adapted to be detachable from it again. On the other hand, because of its simple geometry the clamp is particularly advantageous from a hygiene point of view as adhesions of dirt are reduced to a minimum and the clamps can easily be cleaned and thus dirt can easily be removed.

A further expedient embodiment of the invention is characterised in that the holding means comprises at least one locking means which is designed and adapted for positive and/or non-positive locking of the holding means on the mounting base. In this way, the holding means can be secured on the mounting base in their end position such that they are arranged in a fixed position. The holding means are movable relative to the mounting base by releasing the locking means and can be adjusted or readjusted if necessary.

According to a further preferred embodiment, the holding means comprises a plurality of foot elements, wherein the foot elements are spaced apart from each other. This offers the advantage of increased stability of the joint between the mounting base and the holding elements or the functional units assigned respectively.

A further expedient embodiment of the invention is characterised in that the holding means and the foot element are designed in one piece. In other words, the holding means and the foot element are preferably formed from one piece, for example, as an overall part milled from a solid piece.

According to a further preferred embodiment of the invention, the mounting base is designed as a polygonal profile. Due to the positive locking engagement between the holding means and the polygonal profile, the holding means is thus secured against undesirable twisting in respect of the longitudinal axis of the mounting base.

A further advantageous development of the invention is characterised in that the mounting base is a square profile, wherein the square profile is arranged in such a manner that one of the cross-sectional diagonals of the square profile is at least essentially parallel to the conveyor belt plane. In other words, the square profile is aligned in such a way that two opposing edges of the square profile in each case are arranged in the horizontal or in the vertical, while the square profile surfaces are each inclined by 45° in respect of the horizontal or the vertical. This offers the advantage that contamination can easily be removed due to the inclined square profile surfaces as cleaning agent runs particularly easily off the sloping square profile surfaces.

Alternatively, the cross-sectional diagonal is inclined by a small angle value, for example less than 30°, in relation to the horizontal or the vertical.

According to a further expedient embodiment, the foot element comprises at least two holding limbs which completely encompass the outward facing square profile surfaces in a positive locking manner. In other words, the holding limbs are designed and adapted in such a manner that they rest in a positive locking manner on the outward facing square profile surfaces, that is to say on those surfaces of the mounting base that face away from the centre of the conveyor belt.

A further expedient embodiment provides that a clasping element is arranged on each of the holding limbs, the clasping element encompassing the square profile surfaces respectively opposing each other on a partial region in a positive locking manner, i.e. that the clasping elements are designed and adapted in such a manner that they encompass the respective edge of the mounting base and are in contact with at least one partial region of the profile surfaces opposing each other in a positive locking manner. The opposing square profile surfaces designate those areas of the mounting base which are oriented towards the centre of the conveyor belt.

Figure 2:
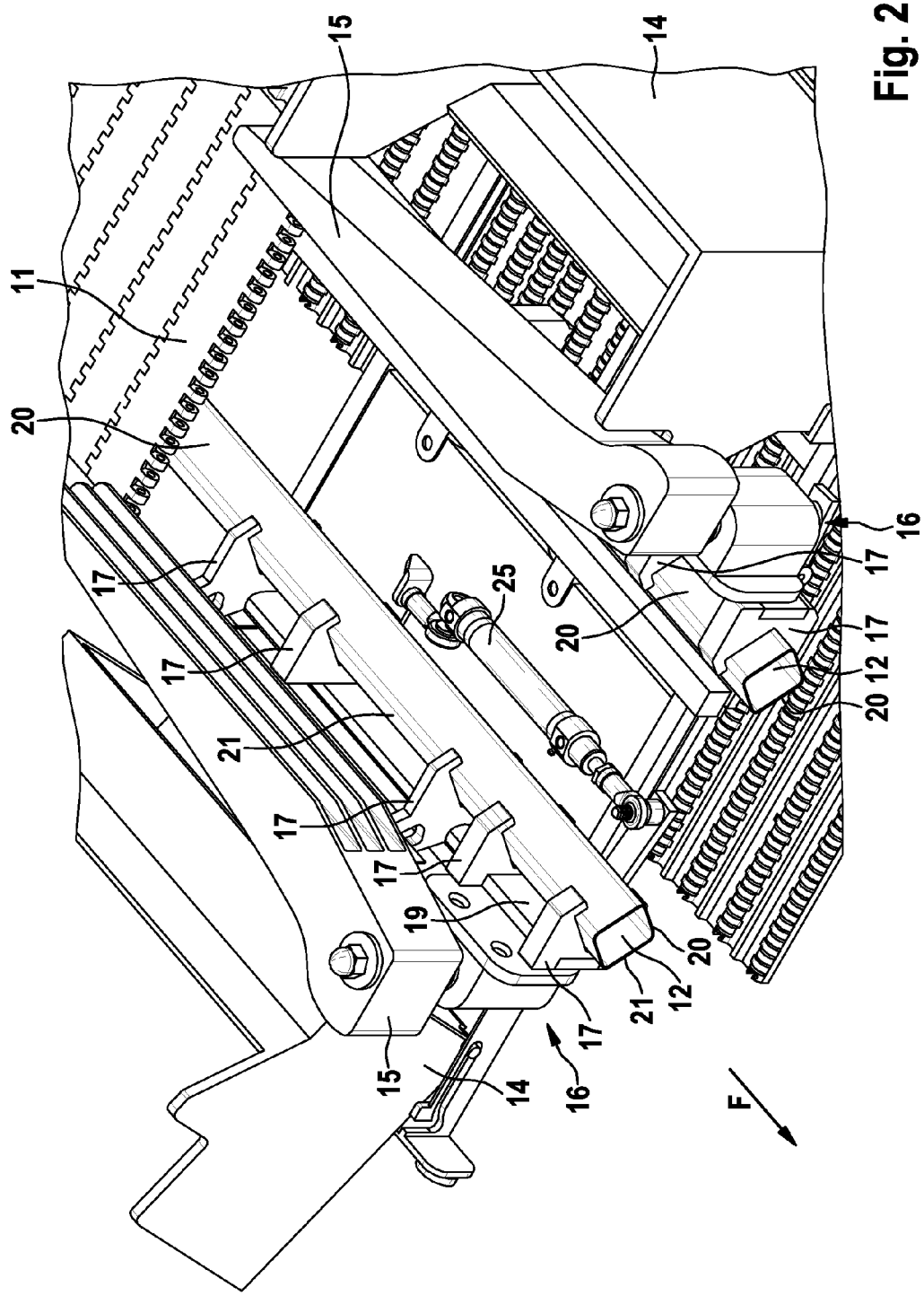
Figure 3:
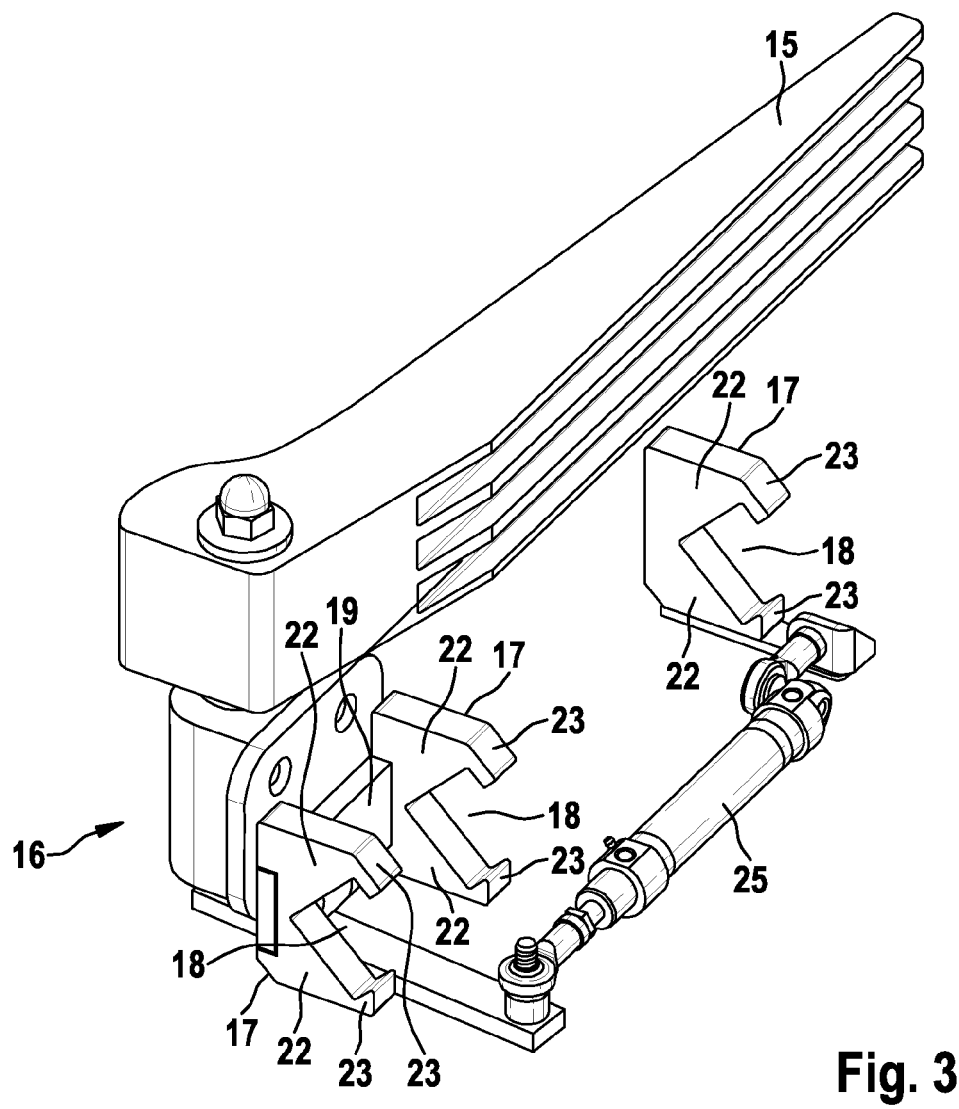
Figure 4:
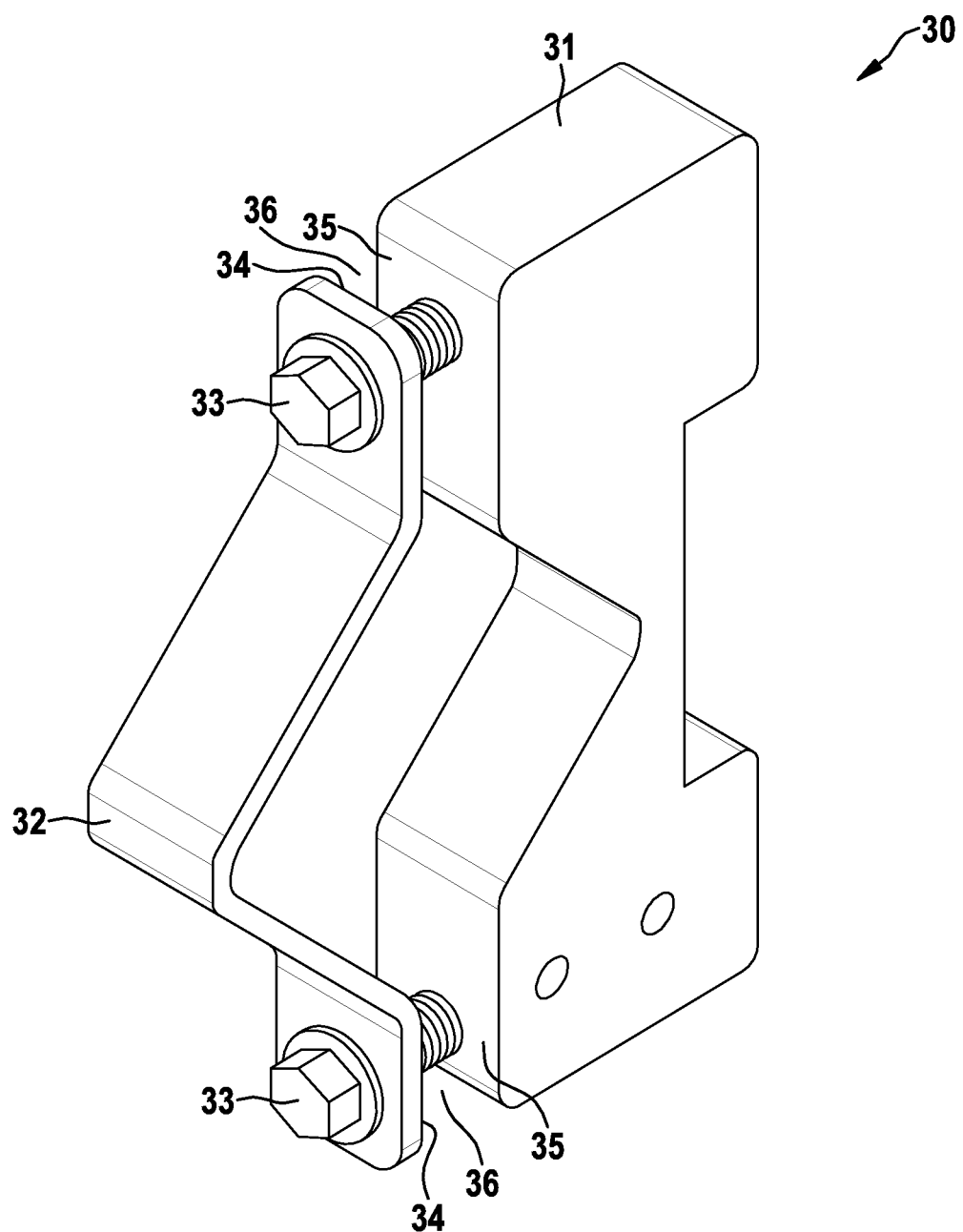
Figure 5:
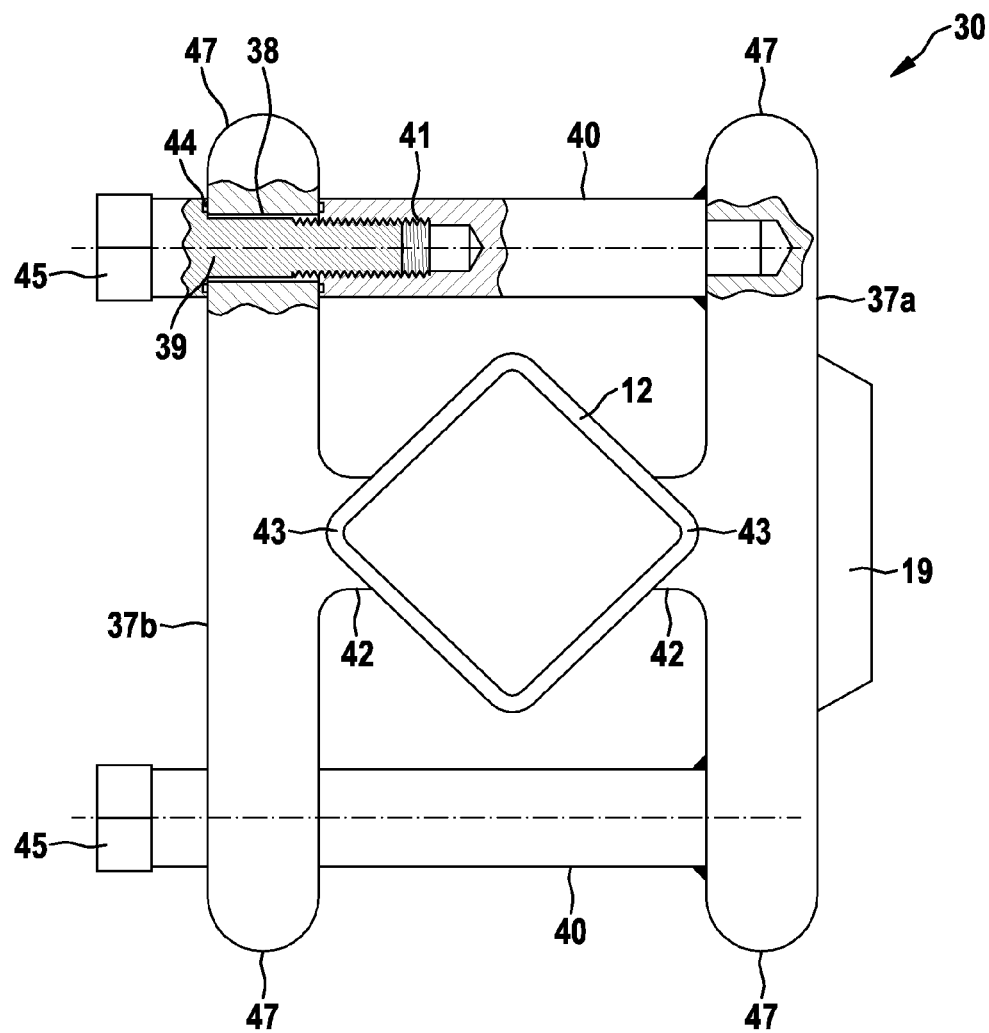
Figure 6:
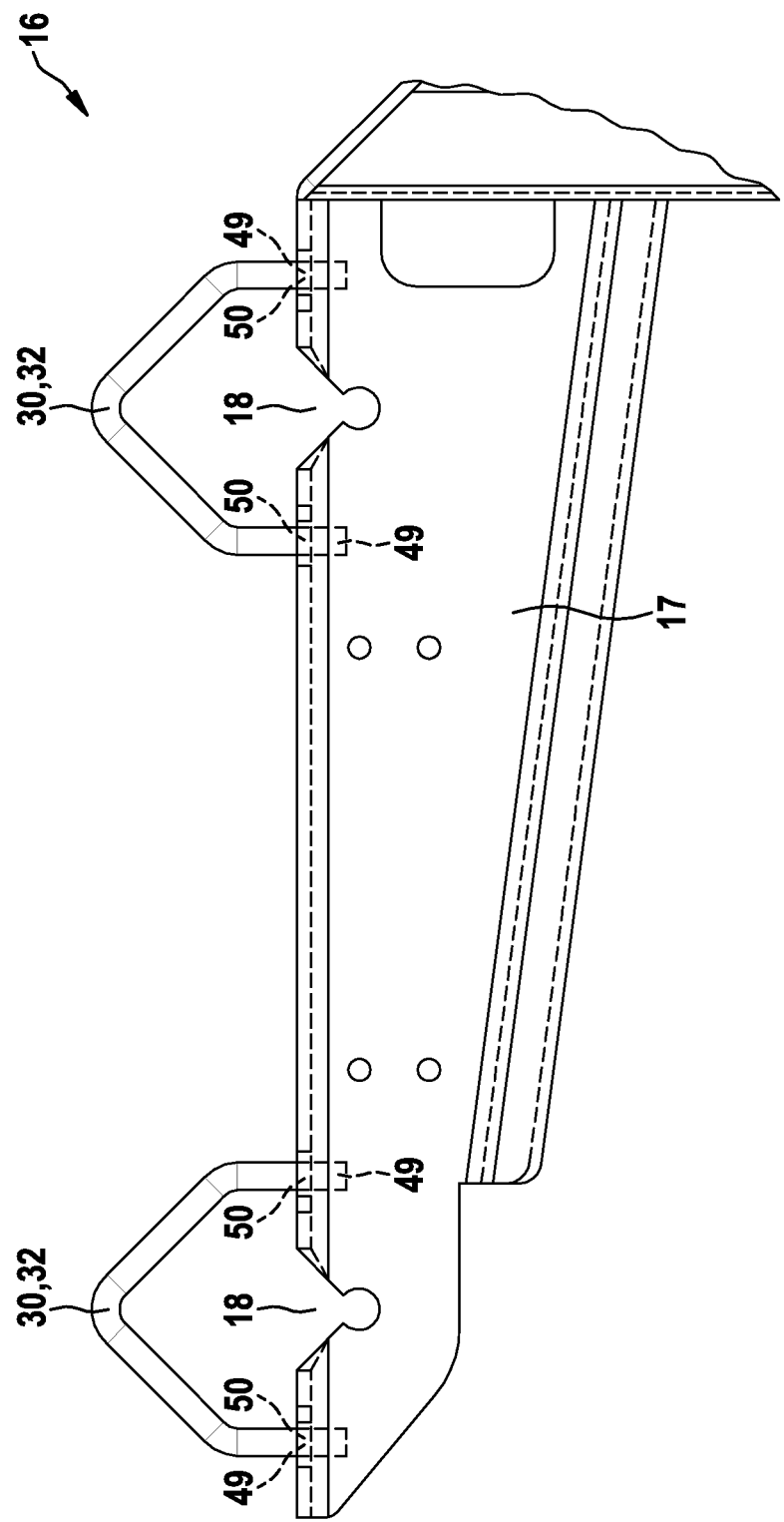
Figure 7:
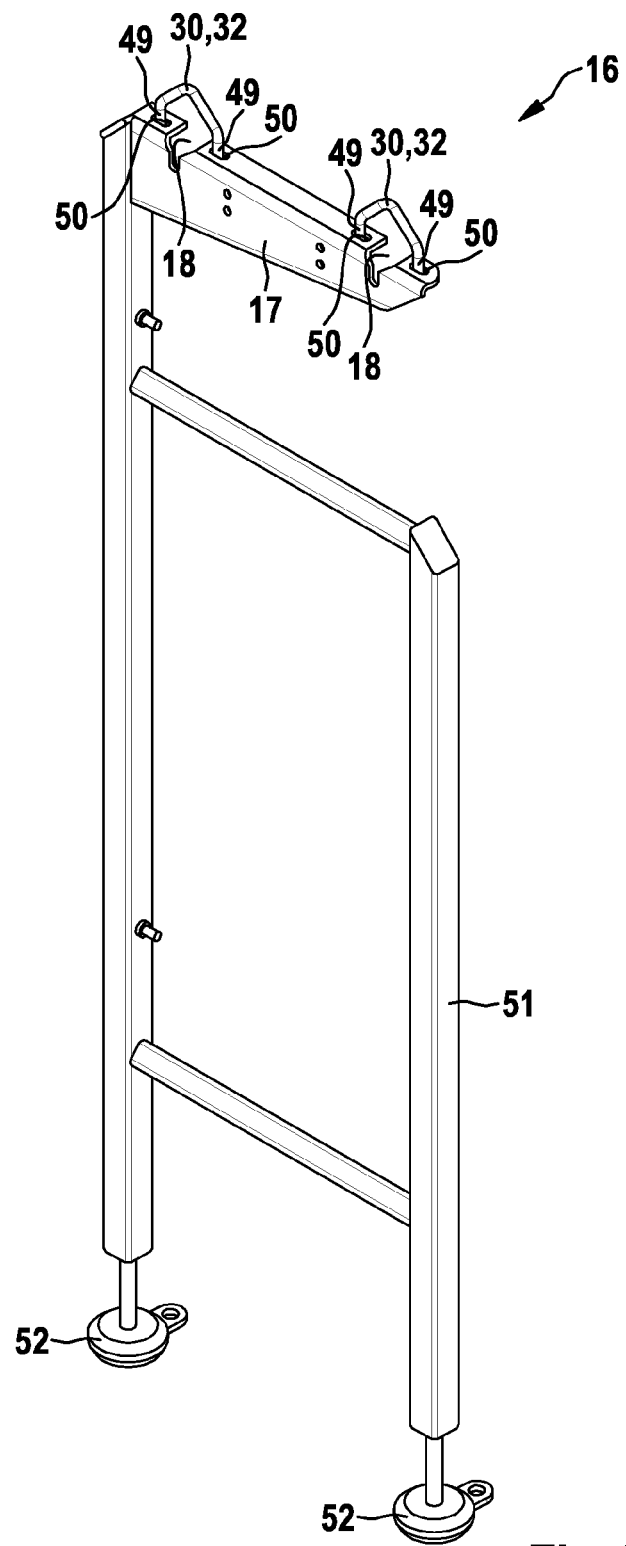

Further preferred and/or expedient features and embodiments of the invention emerge from the dependent claims and the description. Especially preferred embodiments are explained in greater detail with reference to the attached drawing. The drawing shows:

FIG. 1 a perspective overview of the conveying apparatus according to the invention, FIG. 2 a detailed view of the conveying apparatus shown in FIG. 1, FIG. 3 a perspective view of a functional unit with holding means, FIG. 4 a perspective view of a foot element designed as a clamping element, FIG. 5 an alternative embodiment of a clamping element arranged on the mounting base in cross-section, FIG. 6 a further embodiment of a foot element with clamping elements designed as clamps and FIG. 7 a perspective view of a base having the foot element with clamps shown in FIG. 6.

FIG. 1 shows a perspective overview of the conveying apparatus 10 according to the invention. The conveying apparatus 10 is particularly suitable for items in the fish and meat processing industry but is not restricted exclusively to these items. The present invention is also particularly suited to distribution of the items. The conveying apparatus 10 comprises a conveyor belt 11, for example a continuously rotating conveyor belt 11, by means of which the items on said conveyor belt 11 are conveyed in a conveying direction F. A mounting base 12 extends along at least a partial section of the conveyor belt 11. The mounting base 12 preferably extends essentially over the entire length of the conveyor belt. The mounting base 12 is especially preferably arranged on both sides of the conveyor belt 11. Alternatively, the mounting base 12 is arranged in the gap between the rotating conveyor belt 11. It is also possible to arrange the mounting base 12 underneath the conveyor belt 11.

The conveying apparatus 10 further comprises at least one functional unit 13. The functional unit 13 is designed and adapted to interact with the items conveyed on the conveyor belt 11. The functional units 13 are designed, for example, as sensor systems or sensor units, such as optical, acoustic, electromagnetic sensors and/or as weighing devices. Moreover, the functional units 13 may comprise actuators, for example controllable flaps or scrapers, levers, arms, label printers or the like. The functional units 13 may further be designed as static units, such as the container 14 shown in FIG. 1.

FIG. 1, for example, shows functional units 13 designed as controlled arms 15, by means of which items can be transferred from the conveyor belt 11 into various functional units 13 configured as containers 14. The arrangement of the functional units 13, comprised of controlled arms 15 and containers 14, shown in FIG. 1 is used only to illustrate this clearly. The invention, however, is not restricted exclusively to the arrangement of the functional units 13 shown in FIG. 1. In fact, any combination of a plurality of functional units 13 having the same or different function is possible. For example, further functional units 13—not shown in the drawing—may be connected upstream of the containers 14 and the arms 15, such as weighing devices for determining the item weights and/or optical or mechanical sensor systems for analysing the item properties. For example, the arms 15 are activated based on the item properties identified by the functional units 13 configured as sensor systems such that the items are distributed into the respective functional units 13 configured as containers 14 according to their weight or according to other specified item properties.

The functional units 13 are arranged on a holding means 16. The holding means 16 is separably connected to the mounting base 12 and is arranged so as to be adjustable at least in the conveying direction F. In other words, the holding means 16 is designed and configured in such a manner that it is separably connected to the mounting base 12 and at the same time is adjustable in the conveying direction F. In this way, the functional units 13 can be attached to the mounting base 12 without major installation effort and can be detached from it again if required. In addition, exact positioning of the functional units 13 is enabled as the holding means 16 are designed to be adjustable at least in conveying direction F. Alternatively, the holding means 16 may be designed in such a manner that they are not exclusively adjustable in conveying direction F but are rather designed to be linearly positionable in other spatial directions and/or to be rotatable about other axes.

As shown in FIGS. 2 and 3, the holding means 16 comprises at least one foot element 17 with a receiving area 18 which is configured at least partially corresponding to the cross-section of the mounting base 12. Especially preferably, the receiving area 18 of the foot element 17 is designed in such a manner that the foot element 17 at least partially encompasses the mounting base 12 in a positive locking manner. Alternatively, the foot element 17 is designed such that it completely encompasses the mounting base 12.

The foot element 17 and the mounting base 12 are further preferably configured as a linear guide. In other words, the foot element 17 is designed to be linearly movable relative to the mounting base 12 in and counter to the conveying direction F. In an advantageous manner, the holding means 16 comprises at least one locking means—not shown in the drawing—which is designed and adapted for positive and/or non-positive locking of the holding means 16 on the mounting base 12. For example, the locking means comprises at least one screw disposed in a threaded hole of the foot element 17, by means of which the foot element 17 or the holding means 16 is locked on the mounting base 12 such that the holding element 16 is fixed in place on the mounting base 12.

The holding means 16 preferably comprises a plurality of foot elements 17. The foot elements 17 are arranged in this case spaced apart from each other and are further preferably joined to each other by way of a foot element base 19. The foot elements 17 are especially preferably arranged as a plurality at right angles on the foot element base 19 of the foot element 17.

The holding means 16 and the foot element 17 or the holding means 16 and the foot elements 17 respectively are advantageously constructed in one piece. Alternatively, holding means 16 and the foot element(s) 17 are designed in several parts and are joined to each other in a positive and/or non-positive locking manner.

The mounting base 12 is preferably designed as a hollow profile, for example as a stainless steel profile. The mounting base 12 is especially preferably designed as a polygonal profile, for example as the square profile shown in the drawing. The mounting base 12 designed as a square profile is advantageously arranged in such a way that one of the cross-sectional diagonals of the square profile is arranged parallel to the conveying planes of the conveyor belt 11 or is arranged at least essentially parallel thereto, i.e. inclined by a small angle value, preferably between 0° and 30°. In this way, the square profile surfaces 20, which are directed towards each other, and the square profile surfaces 21, which are directed away from each other, are inclined in relation to the horizontal and the vertical.

The foot element 17 further preferably comprises at least two holding limbs 22. The holding limbs 22 are designed and adapted in such a manner that they completely encompass the outward facing square profile surfaces 21 in a positive locking manner.

In an advantageous manner, a clasping element 23 is arranged on each of the holding limbs 22, the clasping element encompassing the square profile surfaces 20 respectively facing each other on a partial region in a positive locking manner.

As illustrated in FIG. 1, a plurality of functional units 13 with different functions are arranged in an advantageous manner in a region of the conveyor belt 11 by means of the holding means 16. Thus one of the containers 14 and one of the controlled arms 15 respectively are arranged as functional units 13 in the above-mentioned region using the holding means. The arm 15 is preferably designed to be pivotable by means of a hydraulic or pneumatic cylinder 25 such that items conveyed on the conveyor belt 11 are distributed into the relevant containers 14 by activating the arms 15.

FIG. 4 shows a perspective view of a foot element 17 designed as a clamping element 30. The foot element 17 is configured in such a manner that the foot element is joined to the mounting base 12—not shown in FIG. 4—in a non-positive locking manner. The clamping element 30 comprises a basic body 31 and a clamp 32. The basic body 31 essentially corresponds to the foot element 17 described previously with the receiving area 18 correspondingly adapted to the mounting base 12. The clamp 32 is also designed corresponding to the geometry of the mounting base 12 in such a manner that the clamp 32 together with the basic body 31 completely encompasses the mounting base 12. The clamp 32 preferably comprises two holes through each of which a screw 33 is guided. To accommodate the screw 33, the clamping element 30 has corresponding threaded bores into which the screw 33 is screwed. The clamp 32 and the foot element 17 are designed in such a manner that a gap 36 remains between the clamping surfaces 34 of the clamps 32 and the contact surface 35 of the foot element 17 when the clamp 32 is in close contact with the mounting base 12. Clamping of the foot element 17 with the clamp 32 is achieved by elastic deformation of the clamp 32 on tightening the screws 33.

FIG. 5 illustrates a clamping element 30 arranged on the mounting base 12 according to a further advantageous embodiment in cross-section. The clamping element 30 comprises two clamping bodies 37a, 37b which are joined to each other by means of two web elements 40. Preferably, the joint of the web elements 40 to one of the clamping bodies 37a is firmly bonded, for example, welded, while the joints of the web elements 40 to the respective other clamping bodies 37b are configured in a non-positive locking manner. The web elements 40 especially preferably have a pin—not shown in the drawing—on the side directed towards the clamping body 37a. Corresponding to this, the clamping body 37a has a tapped blind hole on the inside, i.e. on the side directed towards the web element 40. In this way, the web elements 40 can be positioned and centred exactly on the clamping body 37a. Final joining of the web elements 40 to the clamping body 37a takes place subsequently in a positive locking manner, preferably by welding.

According to a further alternative construction not shown in FIG. 5, the web elements 40 are arranged screwed and sealed on the clamping bodies 37a. One of the clamping bodies 37b comprises two through-bores 38, though each of which a screw 39 is guided. The web elements 40 each comprise, on the side directed towards the clamping body 37b, a threaded bore 41 which is designed to receive the screws 39. The screws 39 are preferably designed to be threadless in the region of the through-bores 38. The clamping body 37b is designed to be screwable to the web elements 40 using the screws 39. In other words, the clamping body 37b is pulled by means of screws 39 towards the web elements 40 and thus towards the clamping body 37a such that the clamping bodies 37a, 37b are pressed against the mounting base 12 on two opposing sides and as a result a non-positive joint is created between the clamping bodies 37a, 37b and the mounting base 12. The clamping bodies 37a, 37b each preferably comprise, on the sides directed towards the mounting base 12, shaping members 42 which are configured correspondingly to the mounting base 12. If, for example, the mounting base 12, as shown in FIG. 5, is designed as a square profile, then the shaping members 42 are configured as a protrusion with a receiving area for receiving the edge regions 43 of the square profile.

Especially preferably, the screws 39 each comprise a sealing means 44 which is arranged between the screw head 45 and the surface of each clamping body 37 with a tight seat. For example, the screw head 45 has a peripheral groove into which an o-ring is inserted. In this way, an otherwise potential ingress of dirt into the through-bores 38 and/or into the threaded portion of the screws 39 is reliably prevented. Overall, the foot element 17 illustrated in FIG. 5 is characterised in particular by the advantageous effects in respect of hygiene as all the parts have surfaces that are as smooth as possible and all regions are easily accessible from the outside. Moreover, there are no hollow spaces directly accessible from the outside in which dirt might otherwise accumulate.

The holding means 16 preferably comprised a plurality of the foot elements 17 or the clamping elements 30. The clamping elements are arranged in this case spaced apart from each other and are further preferably joined to each other by way of the foot element base 19 already described previously. The foot elements 17 are especially preferably arranged as a plurality at right angles on the foot element base 19. The foot element base 19 further preferably comprises lateral surfaces inclined in relation to the horizontal in order to promote the run-off of liquids and/or dirt.

The surfaces are further preferably designed and adapted to be rounded at least in the border area 47 of the clamping elements 30 to effectively prevent undesirable accumulations of dirt. In other words, the clamping elements 30 are configured at least substantially free of corners and/or edges.

FIG. 6 illustrates a further advantageous embodiment of the foot element 17 with the clamping elements 30 configured as clamps 32 which together form the holding means 16. The clamps 32 are preferably configured corresponding in part to the mounting base 12 not shown in FIG. 6. The mounting base 12 is thus completely enclosed by the clamps 32 on the one hand, and by the foot element 17 with its receiving area 18 on the other hand. Especially preferably, the clamps 32 each comprise an external thread on their free limbs 49. The foot element 17 has two through-bores 50 in each case which are designed to receive the clamps 32. In this way, the clamping elements 32 are screwed onto the foot element 17 with nuts—not shown in FIG. 6—and thus the clamp 32 is braced against the mounting base 12 such that the foot element 17 is joined to the mounting base 12 in a non-positive and/or positive locking manner.

As already described at the outset, the functional units 13 (not shown in FIG. 6) are arranged on the holding means 16 which encompass the foot element 17 and the clamps 32. According to a further advantageous embodiment of the invention, which is illustrated in a perspective view in FIG. 7, a base frame 51 is arranged on at least one of the foot elements 17. The base frame 51 comprises preferably height-adjustable feet 52.

According to an advantageous further embodiment not shown in the drawing, the conveying apparatus 10 comprises two, especially preferably a plurality, of the base frames 51. The mounting base 12 is guided through between the clamps 32 and the foot elements 17, respectively, and in this manner is joined to the holding means 16. In this manner, the base frames 51 together with the mounting base 12 form a substructure which is supported relative to the substructure by means of the base frames 51.

Alternatively, the holding means 16 referred to previously and described in FIGS. 1 to 5 are arranged on the base frame 51 to join the base frame 51 to the mounting base 12. To avoid repetition, reference is made in this connection to the appropriate passages of the description.

The invention claimed is:

1. Conveying apparatus for items in the fish and meat processing industry, comprising a conveyor belt for conveying the items in a conveying direction, at least one mounting base extending at least along a partial section of the conveyor belt and at least one functional unit configured for interaction with the items, wherein each of the functional units is arranged on a holding means, characterised in that the holding means are designed and adapted in such a manner that each of the functional units is separably connected to the mounting base by means of the holding means and is arranged so as to be adjustable at least in the conveying direction, wherein the mounting base is a square profile, wherein the square profile is arranged in such a manner that a cross-sectional diagonal of the square profile is at least essentially parallel to the conveyor belt plane.

2. Conveying apparatus according to claim 1, characterised in that the holding means comprises at least one foot element with a receiving area, wherein the receiving area is designed at least partially corresponding to the cross-section of the mounting base.

3. Conveying apparatus according to claim 2, characterised in that the receiving area of the foot element is designed in such a manner that the foot element at least partially encompasses the mounting base in a positive locking manner.

4. Conveying apparatus according to claim 2, characterised in that the foot element is designed in such a manner that the foot element is joined to the mounting base in a non-positive locking manner.

5. Conveying apparatus according to claim 4, characterised in that the foot element comprises at least two clamping elements which are designed and adapted for joining the foot elements to the mounting base.

6. Conveying apparatus according to claim 2, characterised in that the foot element and the mounting base are designed as a linear guide.

7. Conveying apparatus according to claim 2, characterised in that the clamping elements are configured as clamps.

8. Conveying apparatus according to claim 2, characterised in that the holding means comprises a plurality of foot elements, wherein the foot elements are spaced apart from each other.

9. Conveying apparatus according to claim 2, characterised in that the holding means and the foot element are designed in one piece.

10. Conveying apparatus according to claim 2, characterised in that the foot element comprises at least two holding limbs which completely encompass the outward facing square profile surfaces in a positive locking manner.

11. Conveying apparatus according to claim 10, characterised in that a clasping element is arranged on each of the holding limbs, the clasping element encompassing the square profile surfaces respectively opposing each other on a partial region in a positive locking manner.

12. Conveying apparatus according to claim 1, characterised in that the holding means comprises at least one locking means which is designed and adapted for positive and/or non-positive locking of the holding means on the mounting base.

13. Conveying apparatus according to claim 1, characterised in that the mounting base is designed as a hollow profile.

* * * * *